United States Patent [19]
Kurita et al.

[11] Patent Number: 5,758,078
[45] Date of Patent: May 26, 1998

[54] GLOBAL SERVER FOR TRANSMITTING CALLING CAPABILITY TO MEDIATOR AND LOCAL SERVERS FOR REQUESTING CALLING CAPABILITY FROM THE MEDIATOR TO TRANSMIT RESOURCE CAPABILITY TO GLOBAL SERVER

[75] Inventors: Takayoshi Kurita, Numazu; Miyoko Kawaguchi, Mishima, both of Japan

[73] Assignee: Fujitsu Limited, Kawasaki, Japan

[21] Appl. No.: 827,584

[22] Filed: Mar. 28, 1997

Related U.S. Application Data

[63] Continuation of Ser. No. 188,125, Jan. 28, 1994, abandoned, which is a continuation of Ser. No. 655,332, Feb. 14, 1991, abandoned.

[30] Foreign Application Priority Data

Feb. 14, 1990 [JP] Japan ......................... 2-33494
Mar. 7, 1990 [JP] Japan ......................... 2-56040

[51] Int. Cl.$^6$ ......................................... G06F 13/00
[52] U.S. Cl. .......................................... 395/200.33
[58] Field of Search .................... 395/200.33, 200.57, 395/200.53, 200.55, 200.59, 200.62; 370/351, 400, 404, 406, 411, 471, 684

[56] References Cited

U.S. PATENT DOCUMENTS

| | | | |
|---|---|---|---|
| 4,310,720 | 1/1982 | Check, Jr. ................. | 380/25 |
| 4,797,853 | 1/1989 | Savage et al. ............. | 395/842 |
| 4,823,122 | 4/1989 | Mann ......................... | 340/825.28 |
| 4,851,988 | 7/1989 | Trottier et al. ............ | 395/200.57 |
| 4,852,021 | 7/1989 | Inoue et al. ............... | 395/800.3 |
| 4,914,571 | 4/1990 | Baratz et al. .............. | 395/837 |
| 5,109,515 | 4/1992 | Laggis et al. .............. | 395/200.59 |
| 5,191,650 | 3/1993 | Kramer et al. ............. | 395/200.57 |
| 5,341,477 | 8/1994 | Pitkin et al. ............... | 395/200.33 |

OTHER PUBLICATIONS

"Reliable servers in the JASMIN distributed system", by Uppalura, Bell Commun. Res. pp. 105–112, 1987.
Software Engin. Journal, vol: 3 Iss: 5 pp. 161–170, Date: Sep. 1988 Robinson et al. 'Domain-based access control for distributed computing system'.
Proceedings of the 1988 IEEE International Conference on Computer Design: VLSI in Computers and Processors—ICCD '88 pp. 106–109, Date: 3–5 Oct 1988 Ghose et al. 'The capability mechanism of a VLSI processor'.

(List continued on next page.)

*Primary Examiner*—Moustafa M. Meky
*Attorney, Agent, or Firm*—Staas & Halsey

[57] ABSTRACT

In a system for establishing a communication path between one global server and a plurality of local servers and transmitting a request for processing a message through the communication path in a closely coupled computer system, the system includes, a first capability which is issued from the global server or the local server to an arbitrary client to receive the request transmitted from the arbitrary client, a second capability which is issued from the global server or local server to a specified server to establish the communication path ensuring security of the message from the specified server, and a message communication unit for transmitting the message between the global server and the local server by using the first and second capability. The system also includes a destination intermediation unit for registering the first capability and informing the first capability to the local server to intermediate the communication between the global server and the local server. During operation of the system, the global server requests the registration of the first capability from the destination intermediation unit, the local server acquires the first capability from the destination intermediation unit, and the local server requests the establishment of the communication path from the local server to the global server by using the second capability.

10 Claims, 12 Drawing Sheets

OTHER PUBLICATIONS

Proceedings of the 22nd Annual Hawaii International Conference on System Sciences, vol. II: Software Track pp. 36–45 vol. 2 Date: 1989-3-6 Jan. 1989 Pose, Capability based, tightly coupled multiprocessor hardware to support a persistent global virtual memory.

Proceedings 1989 IEEE Symposium on Security and Privacy pp. 56–63 Date: 1–3 May 1989 Gong, 'A Secure identity–based Capability System.'

IEEE International Conference on Communications. Bostonicc/89. World Prosperity through Communications pp. 1154–1159 vol. 3 Date: 11–14 Jun. 1989, Yu, Security Safeguards for intelligent networks.

On Access Checking in Capability–Based Systems; by Richard Y. Kain et al, IEEE Transactions on Software Engineering, vol. SE–13, No. 2, Feb. 1987, pp. 202–207.

IBM Systems Journal, vol. 26, No. 1, 1987, Armonk, New York US; pp. 13–35, Sundstrom et al., 'SNA: Current requirements and direction', p. 16, left column, line 52—p. 17, left column, line 39; p. 24, right column, line 45–line 52.

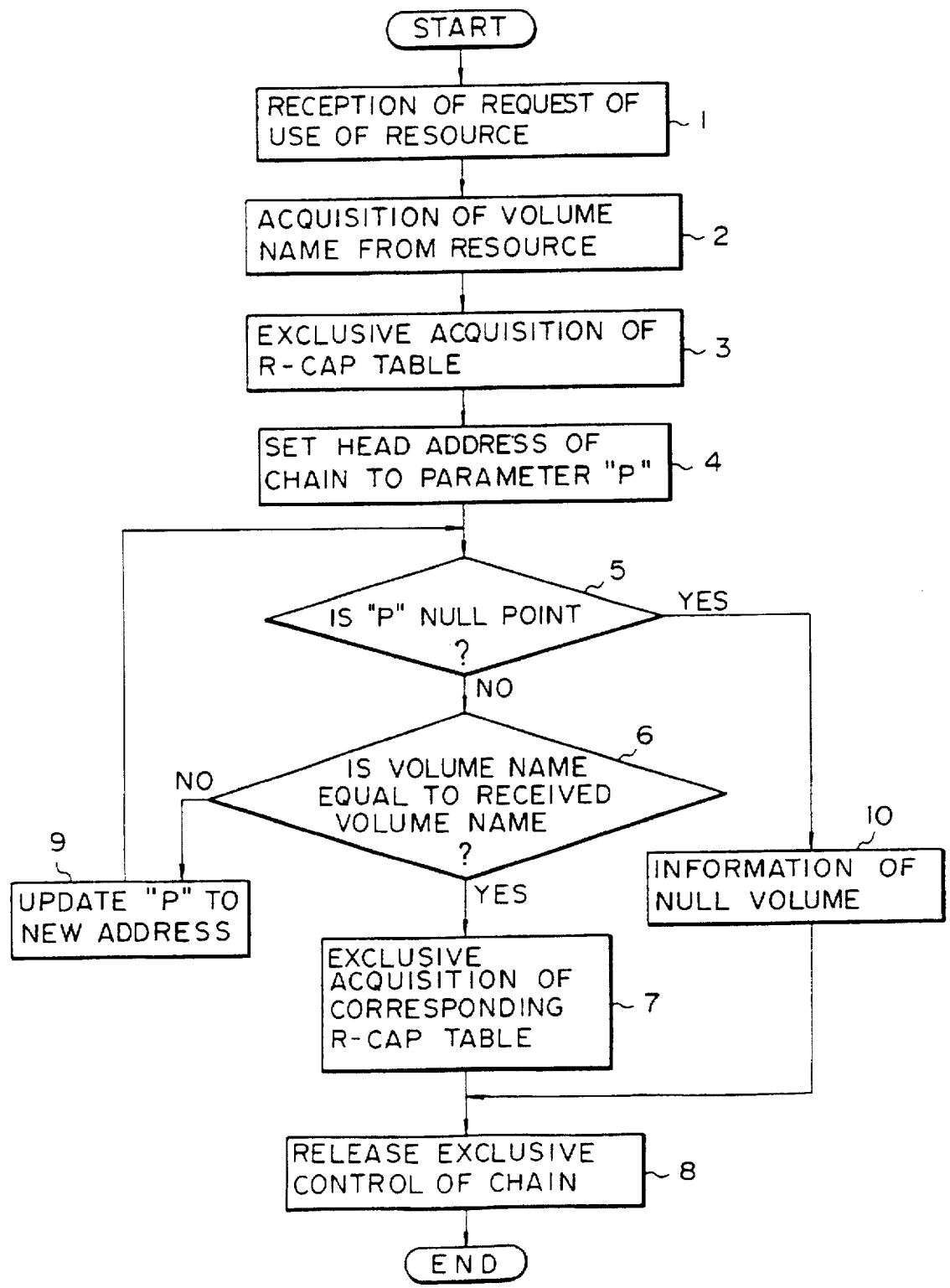

GLOBAL SERVER FOR TRANSMITTING CALLING CAPABILITY TO MEDIATOR AND LOCAL SERVERS FOR REQUESTING CALLING CAPABILITY FROM THE MEDIATOR TO TRANSMIT RESOURCE CAPABILITY TO GLOBAL SERVER

This application is a continuation, of application Ser. No. 08/188,125, filed Jan. 28, 1994, now abandoned, which is a continuation, of application Ser. No. 07/655,332, filed Feb. 14, 1991, now abandoned.

BACKGROUND OF THE INVENTION

1. Field of the Invention

The present invention relates to a system for establishing a communication path between servers in a closely coupled computer system. More particularly, the communication path is established between a global server and a plurality of local servers, and a message communication between servers is performed based on an access by "capability". In general, the server is defined as "any one of processors taking charge of processing", that is, the server is defined as an apparatus for providing various resources, for example, a file, a printer, a communication network and the like in a computer system. Further, the capability is defined as a kind of a "ticket" or "access right" for servers in the message communication between servers.

2. Description of the Related Art

A closely coupled computer system is constituted by a plurality of sub-systems each of which has a plurality of processors. In the sub-system, the number of processor can be enlarged in accordance with user requirements. In the closely coupled computer system, only one global server is provided in the system, and a local server is provided for every sub-system. Accordingly, one global server and a plurality of local servers are provided in the closely coupled computer system, and a request to use a resource is transmitted between the global server and a local server.

In the closely coupled computer system, the global server and the local servers are independently (asynchronously) started up after an initial program load (IPL) operation in the computer system is completed. Accordingly, in a message communication between servers, it is necessary to confirm the start-up state of both servers, and after confirmation, it is necessary to establish a communication path between servers. In the conventional art, a request for confirming start-up is transmitted from the global server to the local server. That is, the global server takes the initiative in the message communication between servers. Accordingly, it is necessary for the global server to always check the start-up state of all local servers, and the global server must recognize subsequent matters to manage the start-up state of all local servers.

First, the global server must get definition data for the local server, and must recognize the location where the local server exists. Second, the global server must recognize the start-up state of the local server. Accordingly, there are demerits in above conventional art as explained below. First, when the definition data for the local server is changed, it is necessary for the global server to perform a restart-up operation for all servers. Second, since the communication path between servers is fixedly established, it is necessary to previously define an order of the message communication between local servers. Second, when any one of the local servers is not started up, the global server must periodically check the start-up state of that local server.

SUMMARY OF THE INVENTION

The object of the present invention is to provide a system for easily establishing a communication path between servers in a closely coupled computer system.

In accordance with the present invention, there is provided a system for establishing a communication path between one global server and a plurality of local server and transmitting a request for processing a message through the communication path in a closely computer system, the establishing system including a first capability or access authorization which is issued from the global server or the local server to an arbitrary client to receive a request transmitted from the arbitrary client; a second capability which is issued from the global server or local server to a specified server to establish the communication path ensuring security of the message from the specified server; a message communication unit for transmitting the message between the global server and the local server by using the first and second capability; and a destination intermediation unit for registering the first capability and informing or supplying the first capability of the local server to intermediate the communication between the global server and the local server; wherein the global server requests the registration or storing of the first capability from the destination intermediation unit, the local server acquires the first capability from the destination intermediation unit, and the local server requests the establishment of the communication path from the local server to the global server by using the second capability.

BRIEF DESCRIPTION OF THE DRAWINGS

In the drawings:

FIG. 12 is a flowchart for explaining the search step in the R-CAP management table shown in FIG. 10.

DESCRIPTION OF THE PREFERRED EMBODIMENTS

Figure 1:
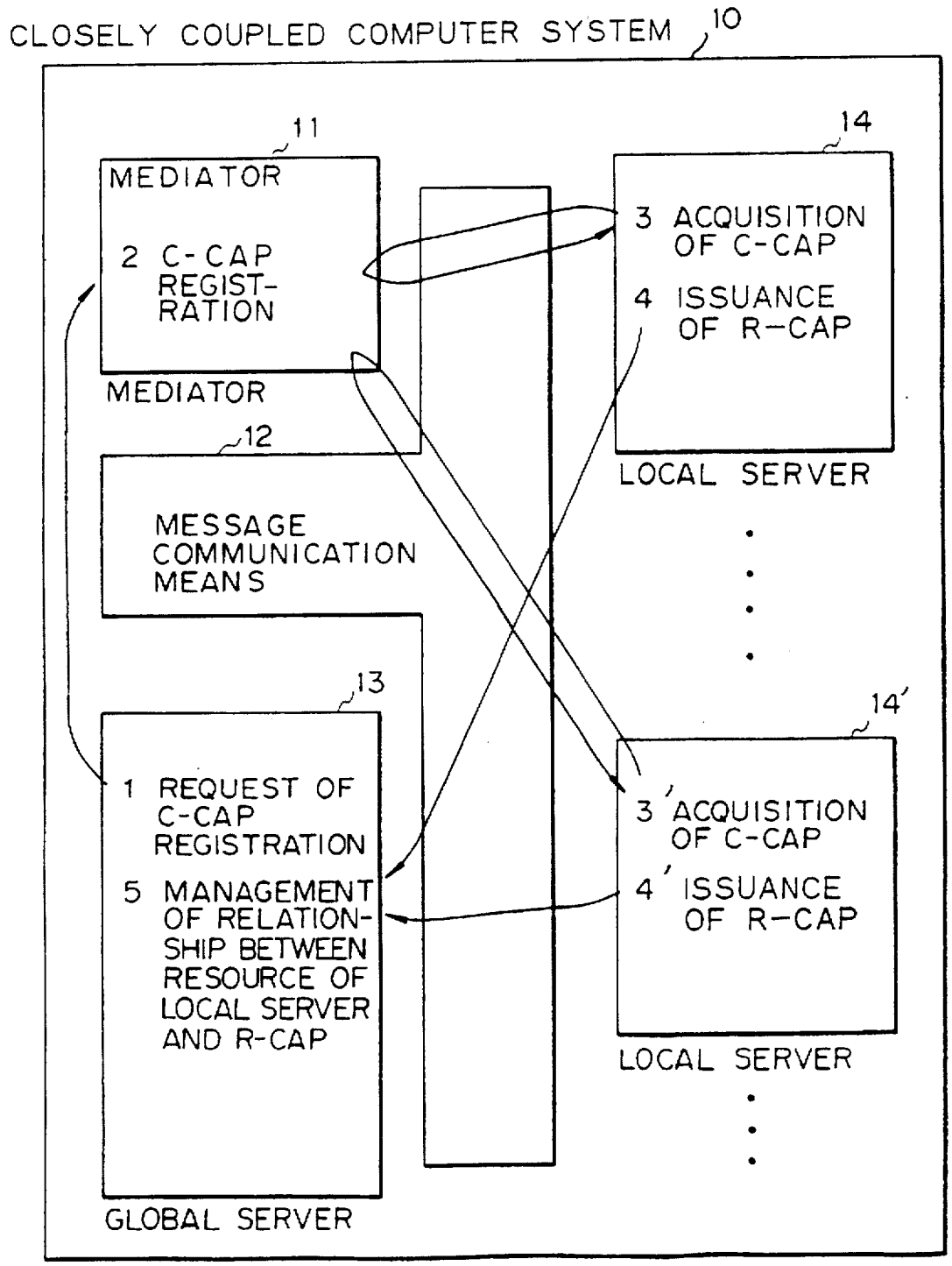
FIG. 1 is a basic block diagram for explaining a first aspect of the present invention.

FIG. 1 is a basic block diagram for explaining the first aspect of the present invention. In FIG. 1, reference number 10 denotes a closely coupled computer system constituted by a plurality of processor modules. 11 denotes a destination intermediation means (below, a mediator), and 12 denotes a message communication means for processing a message communication by using the capability as the destination. Further, 13 denotes a global server, and 14 and 14' denote local servers.

In the first aspect of the present invention, two kinds of capabilities or access authorization are provided for the message communication between servers. That is, the first capability or access authorization is called a "calling capability" and the second capability is called a "resource capability". The calling capability or access authorization (below, C-CAP) is issued by the server (in FIG. 1, the C-CAP is issued from the global server 13) for receiving a request transmitted from an arbitrary client. In this case, the client is defined as a subject which requests the processing of the resource. The server can establish the communication path to an unspecified client existing in an arbitrary location in the system. This establishment of the communication path is performed by opening the C-CAP to the public.

The resource capability (below, R-CAP) is issued from the server (in FIG. 1, the R-CAP is issued from the local server 14 or 14') to a specified client (in FIG. 1, to the global server 13). The R-CAP can ensure the security of the message to the specified client in the communication path.

In FIG. 1, numbers 1 to 5 are basic steps for establishing the communication path from the local server 14, 14' to the global server 13.

In step 1, after initialization of the global server 13 itself is completed, the global server 13 requests registration of the C-CAP to the mediator 11 to start the reception of the processing request from the local server 14, 14'.

In step 2, the mediator 11 checks whether or not the request from the global server 13 is suitable for the registration of the C-CAP. When the request from the global server 13 is suitable, the mediator 11 registers the C-CAP from the global server 13 therein.

In steps 3 and 3', after initialization of the local server 14, 14' itself is completed, the local server 14, 14' issues the requests for acquiring the C-CAP of the global server 13 to the mediator 11, and for establishing the communication path to the global server 13.

In steps 4 and 4', the local server 14, 14' issues the R-CAP to the global server 13 to establish the message communication. The destination of the issuance of the R-CAP is determined based on the C-CAP of the global server 13 already acquired by the local server 14, 14'.

In step 5, after the global server receives the R-CAP, the global server 13 checks whether or not the local server has an authorization. If the local server has authorization, the global server 13 manages the relationship between the R-CAP and the resource of the local server 14, 14'.

As is obvious from the above steps, the mediator 11 has a function of intermediating the destination between the global server 13 and the local server 14, 14'. The communication paths from the global server 13 to the mediator 11 and from local servers 14, 14' to the mediator 11 are fixedly determined in the message communication means 12. Accordingly, it is possible for the server to communicate with the mediator 11 whenever the server is started up. Further, it is possible to access the C-CAP registered or stored in the mediator 11 from any local server 14, 14'. Accordingly, in the present invention, the global server 13 receives the information of completion of start-up from the local server 14, 14', so that it is possible to manage the resource of the local server 14, 14' without fixed definition data for the local server.

In this case, since it is possible for the global server 13 to establish the communication path whenever the global server 13 receives the information of completion of start-up from the local server 14, 14', it is not necessary for the global server 13 to periodically check the start-up state of the local server 14, 14' and it is not necessary for the global server 13 to take the initiative in the message communication between servers.

Figure 2:
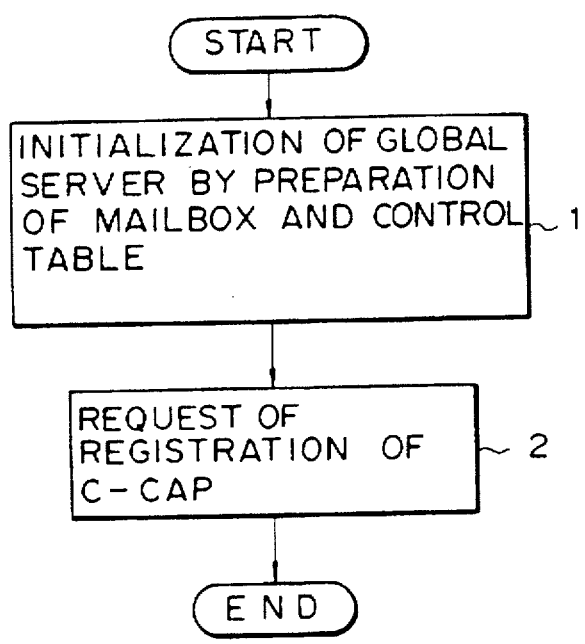
FIG. 2 is a flowchart for explaining an initialization step of the global server.

FIG. 2 is a flowchart for explaining the initialization step of the global server 13. As shown in step 1, a mailbox and control table are prepared in the initialization step of the global server 13, and as shown in step 2, the global server 13 requests the registration or storing of the C-CAP from the mediator 11.

Figure 3:
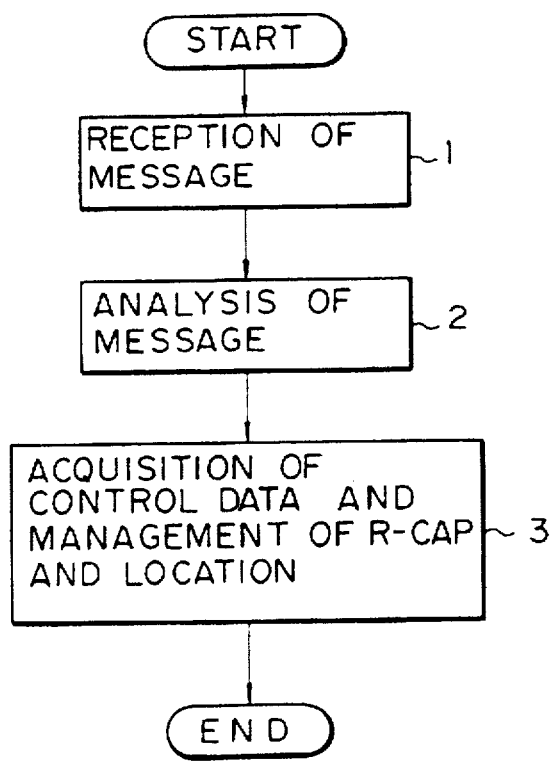
FIG. 3 is a flowchart for explaining further processing steps of the global server.

FIG. 3 is a flowchart for explaining further processing steps of the global server 13. This flowchart explains the steps for establishing the communication from the global server 13 to the local server 14, 14'.

In step 1, the global server 13 receives a message from each of local servers 14, 14'. In step 2, the global server 13 analyzes the messages and checks whether or not the transmitter of each of the messages (i.e., local server 14, 14' is authorized. When the transmitter of a message is authorized, the global server 13 obtains the R-CAP and the location of the local server 14, 14' by analyzing the message. In step 3, the global server 13 acquires an area of control data or control data memory space, and manages the relationship between the R-CAP and the location.

Figure 4:
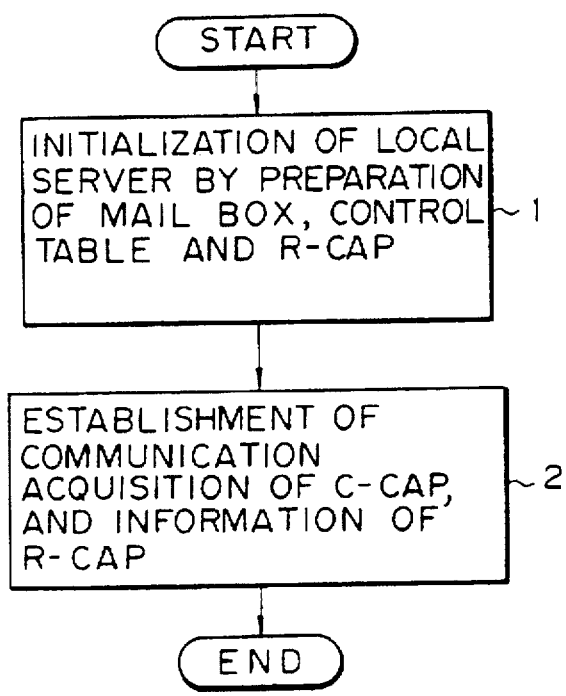
FIG. 4 is a flowchart for explaining an initialization step of the local server.

FIG. 4 is a flowchart for explaining initialization steps of the local server 14, 14'. As shown step 1, a mailbox, a control table, and an R-CAP are prepared in the initialization step of the local server 14, 14'. Further, as shown in step 2, to establish the communication path, the local server 14, 14' acquires the C-CAP of the global server 13 from the mediator 11, and informs the R-CAP to the global server 13.

Figure 5:
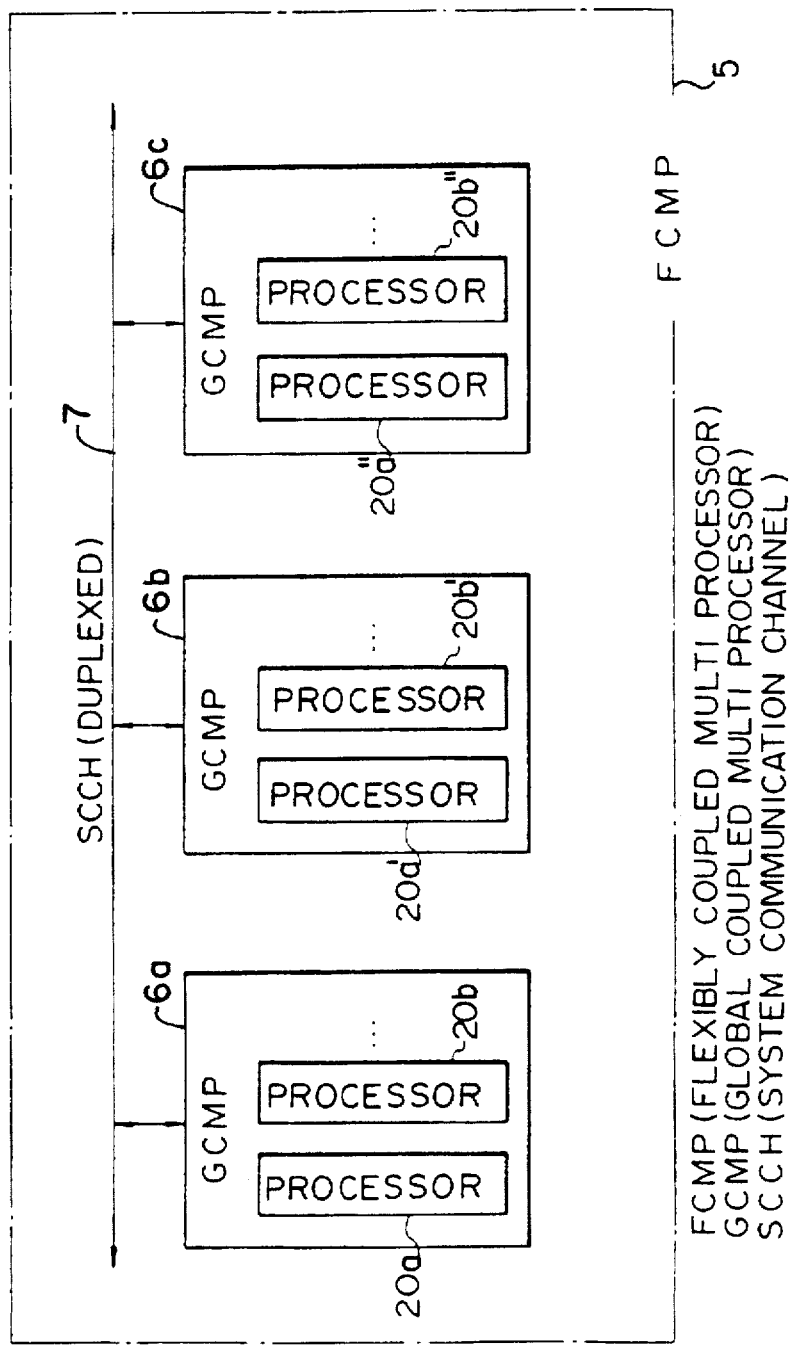
FIG. 5 is a schematic block diagram of a closely coupled computer system applying the present invention.

FIG. 5 is a schematic block diagram of the closely coupled computer system applying the present invention. In FIG. 5, FCMP5 denotes a flexibly coupled multiprocessor, GCMP 6a, 6b, 6c denotes a global coupled multiprocessor, and SCCH 7 denotes a system communication channel. Further, reference number 20 denotes a processor having an instruction execution function.

As shown in the drawing, the FCMP is constituted by a plurality of GCMPs 6a, 6b, 6c, and each of the GCMPs 6a, 6b, 6c is interconnected by the SCCH7 which is duplexed. Further, the GCMPs 6a, 6b, 6c are constituted by a plurality of processors 20a–20b. In this case, the number of processor 20a–20b can be enlarged in accordance with user requirements.

Any one of the processors 20a–20b in the FCMP 6a, 6b, 6c can take charge of the global server 13 shown in FIG. 1, and any one of the processors in the GCMP can take charge of the local server 14, 14' shown in FIG. 1.

Figure 6:
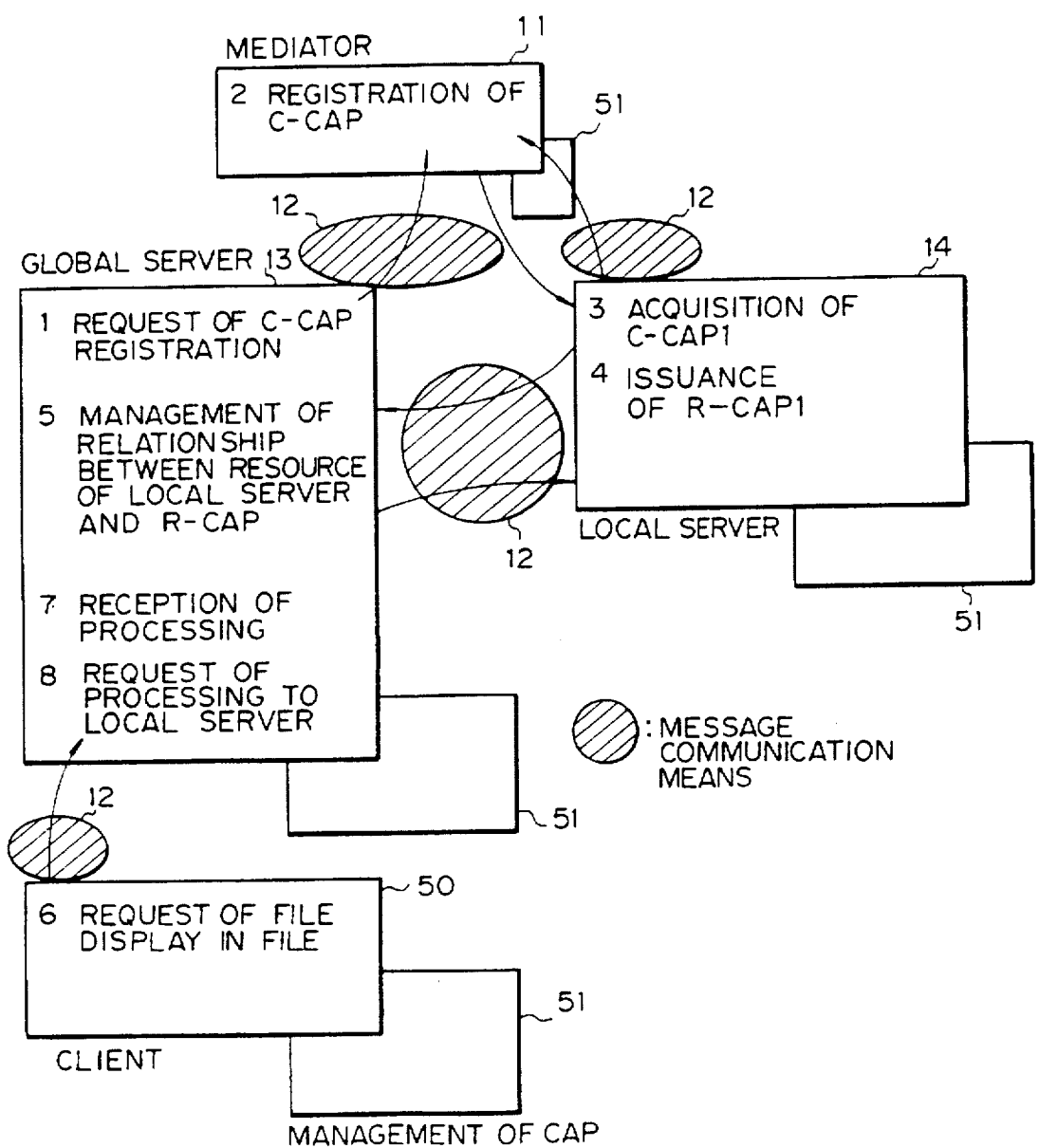
FIG. 6 is a view for explaining an establishment method of a communication path according to the present invention.

FIG. 6 is a view for explaining a method of establishing the communication path according to an embodiment of the present invention. In FIG. 6, the same reference numbers as used in FIG. 1 are attached to the same components in this drawing. Reference number 50 denotes a client, i.e., a subject requesting the processing of a resource. The reference number 51 denotes management means for managing a capability. As shown in the drawing, the management means 51 is provided for the mediator 11, the global server 13, the local server 14, and the client 50.

In FIG. 6, numbers 1 to 8 are basic steps for the processing of a message according to the present invention.

In step 1, after initialization of the global server 13 itself is completed, the global server 13 requests the registration of the C-CAP from the mediator 11. In this case, the C-CAP is used as a destination for the message.

In step 2, the mediator 11 checks whether or not the C-CAP requested from the global server 13 is suitable based on the name of the server and an attribute requested from the server. If the C-CAP is suitable, the C-CAP is registered in the mediator 11. In this case, the attribute is informed to the mediator 11 with the request of the registration of the C-CAP through the message communication means 12.

In step 3, after the local server 14 is started up, it transmits the request to the mediator 11 to establish the communication path to the global server 13, and acquires the C-CAP of the global server 13. Previously, the global server 13 is provided with a specified identification (ID) to specify its own server, and this ID is managed by the mediator 11. Accordingly, the local server 14 utilizes this ID to acquire the C-CAP of the global server 13.

In step 4, the local server 14 issues the R-CAP to the global server 13. In this case, the destination of the R-CAP is given from the C-CAP of the global server 13. The R-CAP is utilized for the message communication hereinafter. Further, the local server 14 manages a volume and informs the name of the volume to the global server 13. The "volume" is defined as a management unit of data stored in a file.

In step 5, the global server 13 checks the attribute of the local server 14 which transmits the R-CAP, and manages the relationship between the R-CAP and the volume name after confirmation of the attribute. After these steps, the communication path is established between the global server 13 and the local server 14.

In step 6, the client 50 requests the global server 13 to display the file of the volume. The global server 13 searches the local server 14 in which the resource exists based on the name of the volume. When the correct local server is found, the global server 13 requests processing of the message by using the corresponding R-CAP.

In steps 7 and 8, when the global server 13 requests the local server 14 to process the message by using the corresponding R-CAP, the local server 14 receives the message from the global server 13 and performs the processing of the request.

Figure 7:
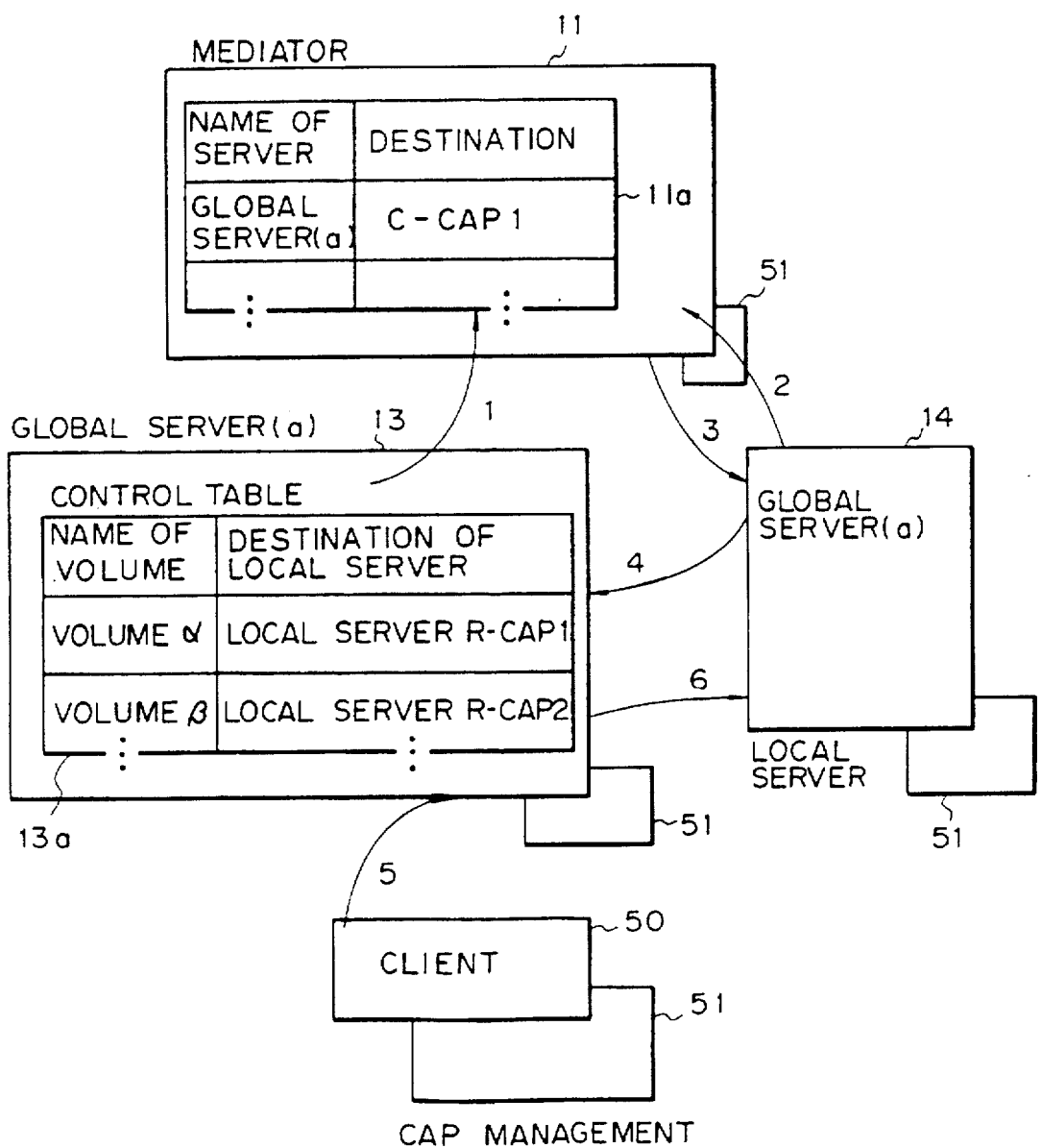
FIG. 7 is a view for explaining a detailed method of establishing the communication path shown in FIG. 6.

FIG. 7 is a view for explaining a detailed method of establishing a communication path shown in FIG. 6. The same reference numbers as used in FIG. 6 are attached to the same components in this drawing. The mediator 11 has a control table 11a, and the global server 13 also has a control table 13a. The control table 11a includes the name of the server and the destination or location, and the control table 13a includes the name of the volume and the destination of the local server 14.

In step 1, when the global server (a) 13 requests the registration of the C-CAP from the mediator 11, the mediator 11 registers the global server (a) 13 (as the name of the server) and the capability C-CAP 1 of the destination or location in the control table 11a.

In step 2, the local server 14 informs the name of the server (global server (a)) to the mediator 11 when the local server wishes to acquire the C-CAP of the global server 13.

In step 3, the mediator 11 informs a destination (C-CAP) of the global server 13 to the local server 14 when the mediator 11 receives the request of the C-CAP from the local server 14.

In step 4, the local server 14 transmits a message to the global server 13. In this case, the message includes the R-CAP indicating its own destination, and the name of the volume (volume α) to be managed by itself. The global server 13 registers the name of the volume (volume α) and the corresponding destination of the local server 14 in the control table 13a. The C-CAP 1 is used as the destination.

In step 5, when the client 50 wishes to process a volume, the client 50 informs the name of the volume (volume α) by using the C-CAP as the destination.

In step 6, when the global server 13 receives a processing request from the client, the global server 13 checks the control table 13a, and obtains the destination (R-CAP 1) of the local server 14 which manages the volume α. Further, the global server 13 informs the request of the client server 50 to the local server 14.

As explained above, the local server 14 receives the destination (C-CAP 1) of the global server 13 from the mediator 11, then requests the establishment of the communication path using the C-CAP 1 from the global server 13. Accordingly, it is possible to arbitrarily establish the communication path between the global server and the local server. Therefore, it is not necessary for the global server to hold the fixed definition data for the local server, and the global server can asynchronously receive the start-up of the local server so that it is possible to easily establish the communication path between the servers.

Figure 8:
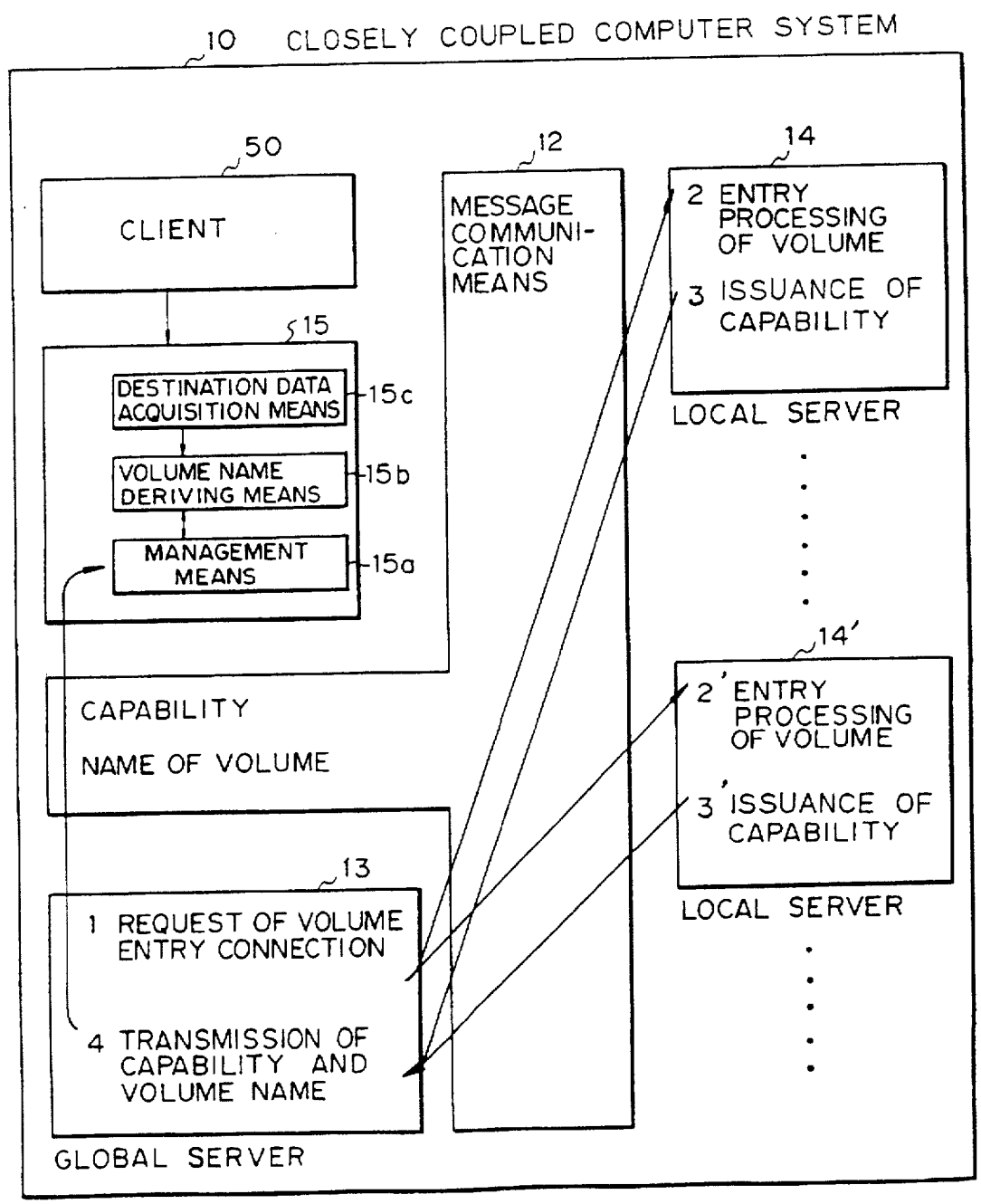
FIG. 8 is a basic block diagram for explaining a second aspect of the present invention.

FIG. 8 is a basic block diagram for explaining the second aspect of the present invention. The same reference numbers as used in FIG. 1 are attached to the same components in this drawing. Reference number 15 denotes a reception server. As a feature of this invention, only one reception server 15 is provided in the composite (or "closely coupled") computer system 10 to receive requests to use the resource from the client server 50.

The reception server 15 is constituted by a management means 15a, volume name deriving means 15b, and destination data acquisition means 15c. The management means 15a manages the capability and the name of the volume transmitted from the global server 13. The volume name deriving means 15b derives the name of the volume in which the resource exists from the name of the resource designated by the client 50. The destination data acquisition means 15c acquires the corresponding capability by searching the management means 15a based on the name of the volume derived from the volume name deriving means 15b.

In step 1, the global server 13 informs the completion of the connection of the volume to the local server 14, 14', and requests an entry of the volume to the local server 14, 14' to provide an environment for handling the request from the client 50. The entry is defined as the establishment of the connection between servers.

In step 2, the local server 14 performs the entry of the volume in response to the request of the entry of the volume from the global server 13.

In step 3, when the entry of the volume is completed by the local server 14, the local server 14 transmits the capability indicating the destination of the volume entered therein.

In step 4, when the global server 13 receives the capability transmitted from the local server 14, the global server 13 transmits the capability and the name of the volume to the reception server 15.

The management means 15a of the reception server 15 manages the capability and the name of the volume transmitted from the global server 13. When the reception server 15 receives the request to use the resource from the client 50, the volume name deriving means 15c derives the name of the volume in which the resource exists from the name of the resource indicated by the client. Further, the destination data acquisition means 15c acquires the capability of the requested volume by searching the management means 15a based on the name of the volume derived from the volume name deriving means 15b. Accordingly, the reception server 15 issues the request to use the volume to the local server 14 by using the capability as the destination. In the present invention, it is possible for the reception server to immediately specify the local server which manages the volume requested from the client without sending any inquiry to the global and local servers.

Figure 9:
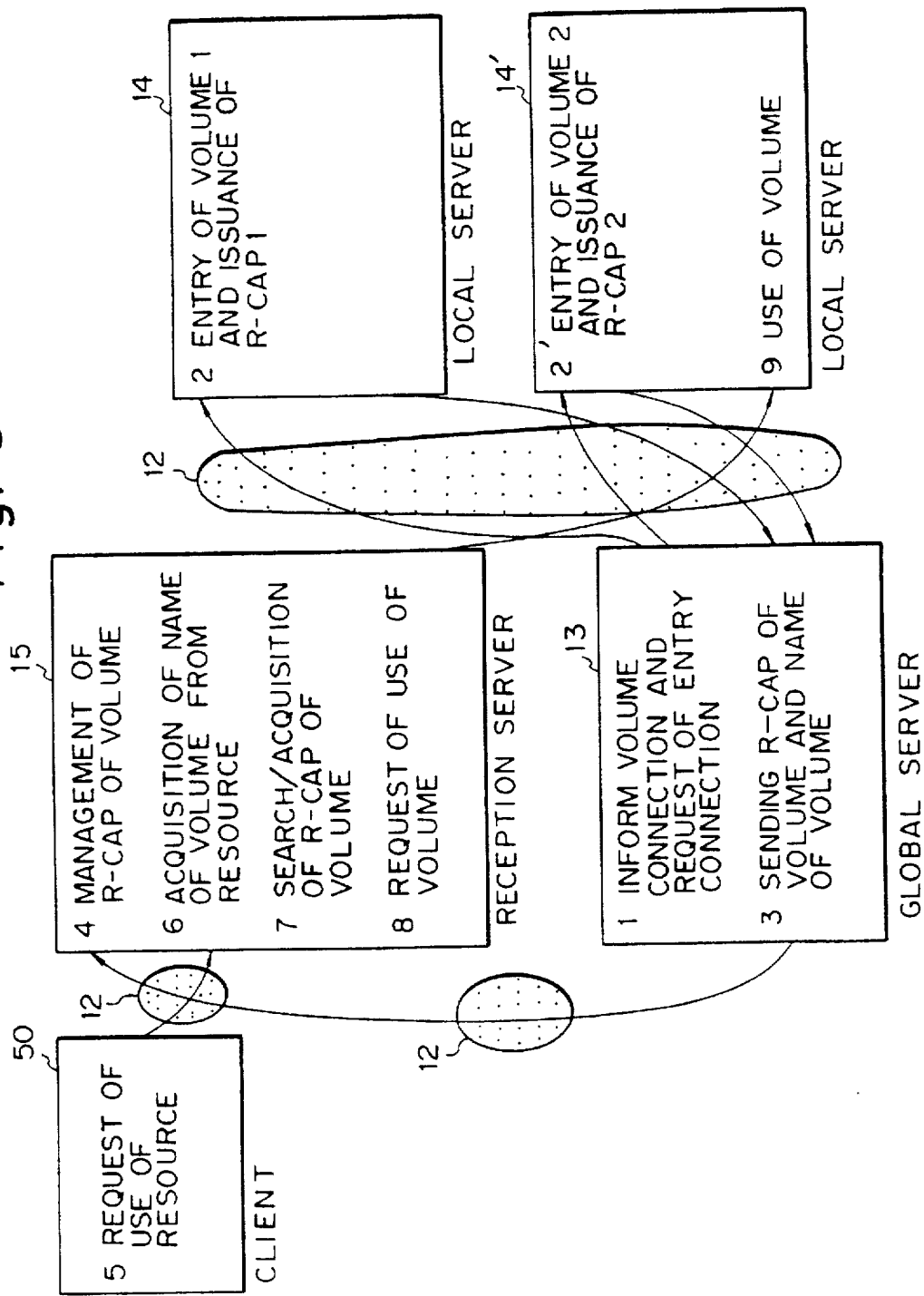
FIG. 9 is a view for explaining an operation of the communication according to the second aspect of the present invention.

FIG. 9 is a view for explaining an operation of the communication according to the second aspect of the present invention.

In FIG. 9, the same reference numbers as used in FIG. 8 are attached to the same components in this drawing. First, the global server 13 performs the processing to establish the communication path between the global server 13 and the local server 14, and between the global server 13 and the reception server 15.

As explained in the first aspect of the present invention, the establishment of the communication path is performed in such a way that, after the initialization of the global server 13 itself is completed, the global server 13 registers the C-CAP in the mediator 11 (see, FIG. 1), the local server 14 acquires the C-CAP of the global server 13 from the mediator 11 after initialization is completed, and the local server 14 transmits the R-CAP to the global server 13 by using the C-CAP as the destination.

In the second aspect of the present invention, the establishment of the communication path between the global server 13 and the reception server 15 is performed based on the following steps. First, after the initialization of the reception server 15 itself is completed, the reception server 15 registers the C-CAP in the mediator 11. After the initialization of the global server 13 is completed, the global server 13 acquires the C-CAP of the reception server 15, and transmits its own C-CAP to the reception server 15 by using the acquired C-CAP as the destination. Further, the establishment of the communication path between the client 50 and the reception server 15 is performed by using the C-CAP of the reception server 15 registered in the mediator 11.

The processing steps shown in FIG. 9 are explained in detail hereinafter.

In step 1, the global server 13 informs the completion of the connection to local server 14 which requested the processing. The information is performed for the volume at which the connection is completed. Further, the global server 13 requests the entry of the volume to the local server 14 to prepare the environment for handling the request from the client 50. In this case, the message communication from the global server 13 to the local server 14 is performed by using the R-CAP of the local server 14 as the destination.

In step 2, when the local server 14 receives the request of the entry of the volume from the global server 13, the local server 14 performs the entry of the volume to prepare the environment for using the requested volume. Further, the local server 14 issues the R-CAP used as the destination of the volume to the global server 13.

In step 3, when the global server 13 receives the R-CAP of the volume from the local server 14, the global server 13 informs the received R-CAP and the name of the volume to the reception server 15.

Figure 10:
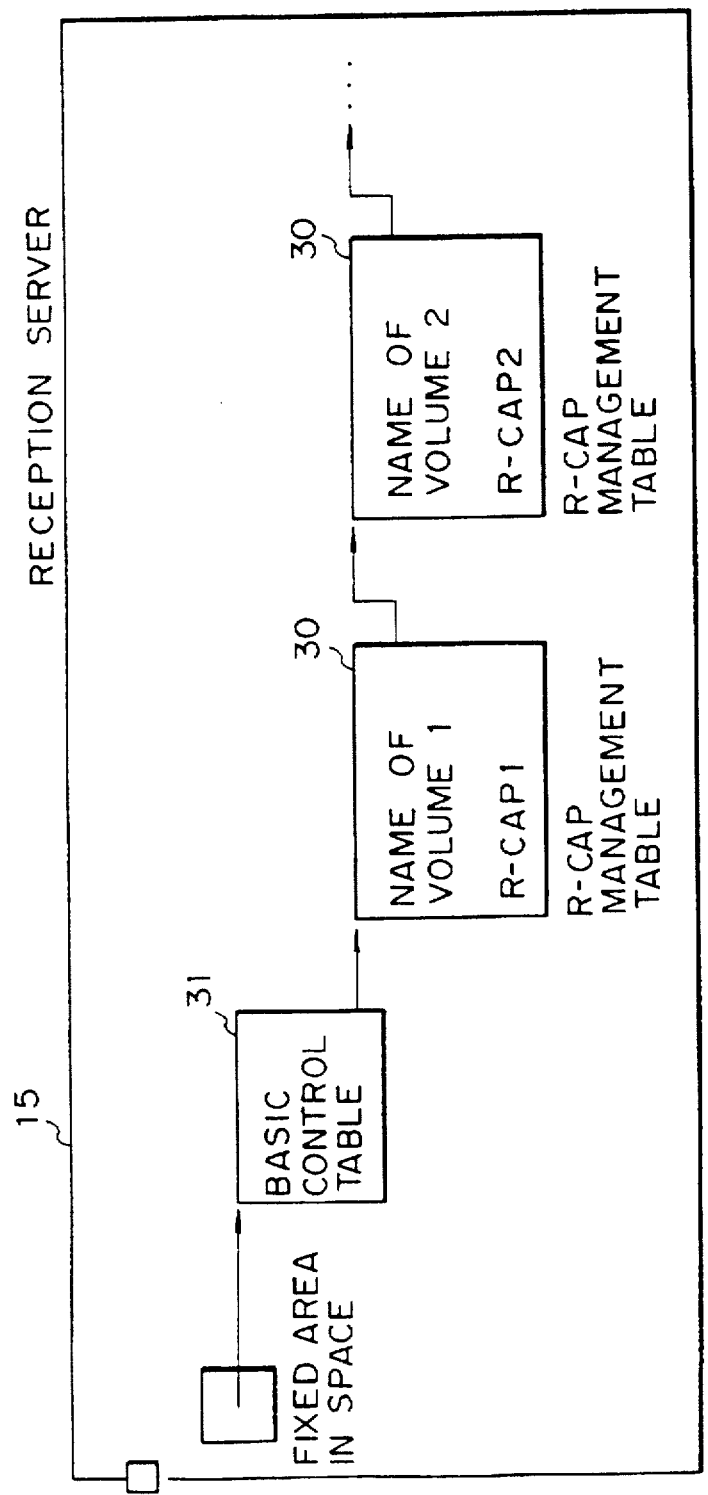
FIG. 10 is a view for explaining a resource capability (R-CAP) management table in the reception server according to the present invention.

In step 4, when the reception server 15 receives the R-CAP and the name of the volume from the global server 13, the reception server 15 registers the R-CAP and the name of the volume in a R-CAP management table 30 (see, FIG. 10).

In step 5, after the communication path between the client 50 and the reception server 15 is established, the client 50 issues the request to use the resource to the reception server 15 by using the C-CAP of the reception server 15 as the destination.

In step 6, when the reception server 15 receives the request to use the resource, the reception server 15 acquires the volume in which the resource exists based on the designated resource name by using a name solution means (not shown).

In step 7, when the reception server 15 acquires the name of the volume, the reception server 15 searches the R-CAP management table 30. In this case, the acquired volume name is used as a keyword for the search. The reception server 15 acquires the R-CAP of the volume corresponding to the volume name.

In step 8, when the reception server 15 acquires the R-CAP of the volume, the reception server issues the request to use the volume to the local server 14 which manages the resource requested from the client 50 by using the acquired R-CAP of the volume as the destination.

In step 9, when the local server 14 receives the request to use the resource, the local server 14 starts to use the volume.

As explained above, since the reception server 15 manages the R-CAP of the volume which the local server manages, the reception server 15 can specify the local server 14 managing the requested volume without sending an inquiry to the global and local servers.

FIG. 10 is a view for explaining a R-CAP management table in the reception server according to the second aspect of the present invention. This R-CAP management table is used for the registration of the R-CAP in the reception server 15 explained in step 4 of FIG. 9. In FIG. 10, the reception server 15 has a basic control table 31, and a plurality of R-CAP management tables 30. The basic control table 31 is pointed from a fixed area at a space, and used as an anchor point. The R-CAP management tables 30 are interconnected to each other in the form of a chain. Each R-CAP management table 30 manages an R-CAP and the name of a volume. In this case, the R-CAP and the name of the volume are indicated by the volume transmitted from the global server 13.

Figure 11:
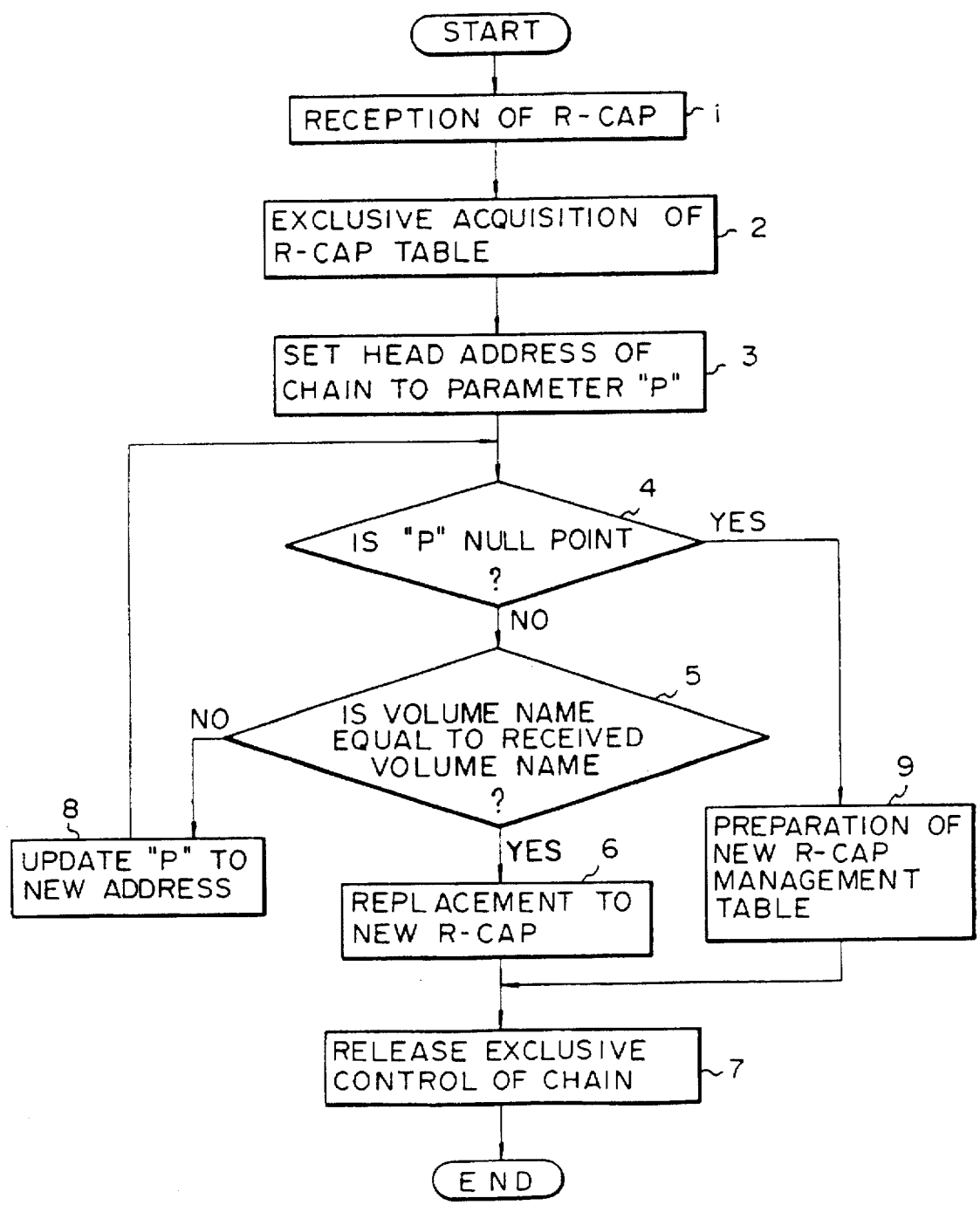
FIG. 11 is a flowchart for explaining the registration in the R-CAP management table shown in FIG. 10.

FIG. 11 is a flowchart for explaining the registration in the R-CAP management table shown in FIG. 10. This flowchart explains in detail the registration process in the step 4 of FIG. 9.

When the management means 15a in the reception server 15 receives the message of the R-CAP from the global server 13 (step 1), the management means 15a exclusively acquires the chain or linked list of the R-CAP management table 30 (step 2). Next, the management means 15a searches the R-CAP management table 30 to find the same volume name as the received volume name. That is, the management means 15a defines a heading address of the chain as a parameter P (step 3) to find the same volume name as the received volume name, and judges whether or not the parameter P indicates a NULL point (step 4) where a NULL point identifies the end of the list, and when the parameter P is not a NULL point (NO), the management means 15a judges whether or not the volume name of the R-CAP management table is the same volume name as the received volume name (step 5). When the volume name is the same as the received volume name (YES), a new R-CAP replaces the previous R-CAP of the volume in the R-CAP management table 30 (step 6). Further, the management means 15a releases the exclusive control of the chain of the R-CAP management table 30.

In step 4, when the parameter P is a NULL point (YES), the management means 15a prepares a new R-CAP management table (step 9). Further, in step 5, when the volume name of the R-CAP management table is not the same as the received volume name (NO), the parameter P is updated to a new address (step 8).

FIG. 12 is a flowchart for explaining the search step in the R-CAP management table shown in FIG. 10. These steps explain in detail the search process at steps 5, 6, and 7 of FIG. 9. When the reception server 15 receives the request to use the resource from the client (step 1), the management means 15a in the reception server 15 acquires the volume name based on the resource name from the client 50 (step 2), and the management means 15b exclusively acquires the chain of the R-CAP management table 30 (step 3). Next, the management means 15a searches the R-CAP management table 30 to find the same volume name as the received volume name. That is, the management means 15a defines a head address of the chain as a parameter P (step 4) to find the same volume name as the received volume name, and judges whether or not the parameter P indicates a NULL point (step 5), and when the parameter P is not a NULL point (NO), the management means 15a judges whether or not the volume name of the R-CAP management table is the same volume name as the received volume name (step 6). When the volume name is the same as the received volume name (YES), the management means 15a exclusively performs the acquisition of the corresponding R-CAP management table (step 7). Further, the management means 15a releases the exclusive control of the chain of the R-CAP management table 30.

In step 5, when the parameter P is a NULL point (YES), the management means 15a informs the message which the volume can not use (step 10). Further, in step 6, when the volume name of the R-CAP management table does not correspond to the received volume name (NO), the parameter P is updated to a new address (step 9).

We claim:

1. An apparatus for establishing a communication path and processing a request for transmitting a message through the communication path in a closely coupled computer system, the apparatus comprising:

a global server for transmitting a calling capability to a mediator, said calling capability including an identification data used for communicating with said global server; and a plurality of local servers, operatively coupled to the global server, wherein each of said plurality of local servers starts up independently, requests said calling capability to said mediator, and transmits a resource capability with a resource identifier to said global server based on said calling capability, said resource capability including an identification data used for communicating with said local server;

wherein said mediator storing said calling capability transmitted from said global server and transmitting said calling capability to one of said plurality of local servers when any local server requests; and wherein said global server manages a relationship between a resource capability and a resource managed by one of said plurality of local servers.

2. A system for establishing a communication path as claimed in claim 1, wherein said global server includes a control table constituted by a name of at least one of the local servers and a destination of the local server.

3. A method for establishing a communication path, comprising the steps of:

a) registering first capability data of a global server in a mediator, said first capability including an identification data used for communicating with said global server;

b) transmitting the first capability data from the mediator to a local server based on a first request from the local server; and c) transmitting second capability data to the global server from the local server based on the first capability data, the second capability data including a destination of the local server to establish the communication path between the global server and the local server.

4. A method as claimed in claim 3, wherein said step (a) is only performed when the first capability data is determined to be authorized for registration.

5. A method as claimed in claim 3, wherein said step (c) is performed only if the local server is authorized to establish the communication path.

6. A method as claimed in claim 3, wherein the second capability data includes name data of a volume which is managed by the local server.

7. A method for establishing a communication path, comprising the steps of:

a) registering first capability data of a global server in a mediator, if authorized;

b) transmitting the first capability data from the mediator to a local server based on a first request from the local server;

c) transmitting second capability data to the global server from the local server based on the first capability data, the second capability data including a destination of the local server to establish the communication path between the global server and the local server;

d) transmitting a second request to use a volume from a client to the global server;

e) locating the second capability of the local server managing the volume, in the global server;

f) transmitting a third request from the global server to the local server based on the second capability data located in said step (e); and g) accessing the volume using the local server, based on the third request.

8. An apparatus for establishing a communication path and processing a request for transmitting a message through the communication path in a closely coupled computer system, the apparatus comprising:

a global server, which is initialized independently, transmitting a calling capability, said calling capability including an identification data used for communicating with said global server;

a mediator receiving the calling capability from the global server and registering the calling capability in the mediator; and a local server, which is initialized independently, requesting acquiring the call capability of the global server from the mediator after the local server has been initialized, wherein the mediator transmits the calling capability to the local server, the local server transmits a resource capability including an identification data used for communicating with said local server together with a resource identifier to the global server, the global server registers the resource capability and the resource identifier, and the global server manages the relationship between the resource capability and the local server.

9. The apparatus as claimed in claim 8, wherein when the local server requires access to the global server, the global server determines whether the local server is permitted to have access based on the registered correspondence between the resource capability and resource identifiers.

10. An apparatus for establishing a communication path and processing a request for transmitting a message through the communication path in a closely coupled computer system, the apparatus comprising:

a global server transmitting a calling capability to a mediator, said calling capability including an identification data used for communicating with said global server; and a plurality of local servers, operatively coupled to the global server, wherein each of said plurality of local servers power up independently, requests said calling capability from said mediator, and transmits a resource capability with a resource identifier directly to said global server, wherein said mediator stores said calling capability transmitted from said global server and transmits said calling capability to one of said plurality of local servers when any local server requests said calling capability of said global server, and wherein said global server manages a relationship between a resource capability and a resource managed by one of said plurality of local servers.

* * * * *

UNITED STATES PATENT AND TRADEMARK OFFICE
CERTIFICATE OF CORRECTION

PATENT NO. : 5,758,078
DATED : May 26, 1998
INVENTOR(S) : Takayoshi KURITA et al.

It is certified that error appears in the above-identified patent and that said Letters Patent is hereby corrected as shown below:

Title Page, Abstract, line 5, after "includes" delete ",".

Col. 1, line 32, change "processor" to --processors--.

Col. 2, line 8, change "server" (second occurrence) to --servers--;
line 10, after "closely" insert --coupled--.

Col. 4, line 2, after "server" insert --14, 14'--;
line 43, change "number 20 denotes a processor" to --numbers 20a, 20b, 20a', 20b', 20a", 20b" denote processors--;
line 45, after "FCMP" insert --5--;
line 49, change "processor" to --processors--;
line 52, change "20b" to --20b"--;
lines 52-53, delete "6a, 6b, 6c" and insert --5--;
line 54, after "processors" insert --20a-20b-- and after "GCMP" insert --6a,6b,6c--.

Signed and Sealed this

Twenty-second Day of September, 1998

Attest:

BRUCE LEHMAN

Attesting Officer    Commissioner of Patents and Trademarks